United States Patent
Shimura

(10) Patent No.: US 8,004,408 B2
(45) Date of Patent: Aug. 23, 2011

(54) PNEUMATIC TIRE WITH TRANSPONDER AND INDICATOR OF TRANSPONDER POSITION

(75) Inventor: Kazuhiro Shimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 933 days.

(21) Appl. No.: 11/632,919

(22) PCT Filed: Aug. 22, 2005

(86) PCT No.: PCT/JP2005/015196
§ 371 (c)(1),
(2), (4) Date: Jan. 17, 2007

(87) PCT Pub. No.: WO2006/022218
PCT Pub. Date: Mar. 2, 2006

(65) Prior Publication Data
US 2008/0246588 A1  Oct. 9, 2008

(30) Foreign Application Priority Data
Aug. 23, 2004 (JP) ................................. 2004-242279

(51) Int. Cl.
*G08B 13/14* (2006.01)
*B60C 5/00* (2006.01)
(52) U.S. Cl. .................... 340/572.1; 340/572.8; 152/450
(58) Field of Classification Search ............... 340/539.1, 340/572.1–572.9, 10.1; 152/450
See application file for complete search history.

(56) References Cited

U.S. PATENT DOCUMENTS

| | | | | |
|---|---|---|---|---|
| 5,319,354 A | * | 6/1994 | Myatt | 340/572.7 |
| 6,105,860 A | * | 8/2000 | Hattori | 235/375 |
| 6,147,659 A | * | 11/2000 | Takahashi et al. | 343/866 |
| 6,257,289 B1 | * | 7/2001 | Tomita et al. | 152/152.1 |

(Continued)

FOREIGN PATENT DOCUMENTS

JP   10-115508   5/1998

(Continued)

OTHER PUBLICATIONS

English translation of JP 2004-090775 (cited on IDS).*

(Continued)

*Primary Examiner* — Benjamin C Lee
*Assistant Examiner* — Michael T Shannon
(74) *Attorney, Agent, or Firm* — Greer, Burns & Crain, Ltd.

(57) ABSTRACT

Provided is a pneumatic tire with which a search time for a transponder can be reduced, and with which, for a passive transponder functioning with energy transmitted from the outside, efficiency of energy transmission can be enhanced. The pneumatic tire of the present invention provided with a transponder has an identification tag, which indicates a position of the transponder, and which is disposed to an outer surface of a portion of the tire, the portion being where the transponder is disposed. Furthermore, for a pneumatic tire having a transponder on a sidewall part thereof, an identification tag, which indicates the position of the transponder, is provided to an outer surface of a portion of the tire, the portion being where the transponder is disposed, and another identification tag, which indicates at least the position of the transponder in the circumferential direction of the tire, is provided to an outer surface of the other sidewall part of the tire, which is on the opposite side of the sidewall part where the transponder is disposed.

4 Claims, 3 Drawing Sheets

U.S. PATENT DOCUMENTS

2004/0134578 A1* 7/2004 Kleckner ............... 152/152.1
2005/0128086 A1* 6/2005 Brown et al. ............ 340/572.8

FOREIGN PATENT DOCUMENTS

| | | | |
|---|---|---|---|
| JP | 2001-63325 A | * | 3/2001 |
| JP | 2001-287512 | | 10/2001 |
| JP | 2002-307914 | | 10/2002 |
| JP | 2004-82775 | | 4/2004 |
| JP | 2004-90775 | | 4/2004 |
| JP | 2004-148953 | | 5/2004 |

OTHER PUBLICATIONS

English translation of JP 2004-148953 (cited on IDS).*
English Translation of JP2001-63325A.*

* cited by examiner

PNEUMATIC TIRE WITH TRANSPONDER AND INDICATOR OF TRANSPONDER POSITION

TECHNICAL FIELD

The present invention relates to a pneumatic tire provided with a transponder, and particularly to a pneumatic tire with which a search time for a transponder can be reduced, and with which, for a passive transponder functioning with energy transmitted from the outside, efficiency of energy transmission can be enhanced.

BACKGROUND ART

Recently, transponders, which have a transmitting and receiving functions and a storing function, are provided to pneumatic tires. By using the transponders, tire manufactures control the manufacturing of tires, and tire purchasers control tire service histories, and obtain information on inflation pressures, temperature, and the like of tires. As ways of providing such transponders, for example, there are methods in which a transponder is embedded in a tire structure, and in which a transponder is adhered to the internal surface of a tire (for example, refer to Patent Document 1 and Patent Document 2).

However, a portion of the transponder embedded in the tire structure or of the transponder adhered to the internal surface of the tire cannot be identified at all when viewed from the outside. For this reason, the portion needs to be searched for using a read device. In a case of a common transponder, e.g., particularly one for individual recognition, since a read distance (a communication range) when data are read is not greater than 1 meter, a position where the transponder responds needs to be searched while moving a read device along the circumferential direction of the tire.

As a result, in a case where, for example, a tire is mounted on a vehicle so that a transponder is located on a side of the tire, the side facing laterally inward toward the vehicle, it is difficult to transmit an electric wave of the read device to the transponder, and is difficult to search the transponder. Particularly, in a case where the vehicle stops in a way that the transponder is located closed to the ground surface, it is necessary to move the vehicle, and again perform the reading operation. For a passive transponder which functions with transmitted energy from the outside, the read device needs to be maintained close to the passive transponder at the time of communication. However, unless the position of the transponder is accurately determined, energy transmission is less efficient, and an unnecessarily long period of time is needed for performing a communication operation with the transponder.

Patent Document 1: Japanese Utility Model Kokai Application No. Hei 2-123404
Patent Document 2: Japanese Patent Kokai Application No. Hei 7-132713

DISCLOSURE OF THE INVENTION

An object of the present invention is to provide a pneumatic tire with which a search time for a transponder can be reduced, and with which, for a passive transponder functioning with energy transmitted from the outside, efficiency of energy transmission can be enhanced.

To achieve the above object, the pneumatic tire of the present invention is characterized in that, in the pneumatic tire having a transponder, an identification tag, which indicates a position of the transponder, is provided to the outer surface of a portion of the tire, the portion being where the transponder is disposed.

Moreover, the pneumatic tire of the present invention is characterized in that, in the pneumatic tire having a transponder on a sidewall part thereof, a first identification tag, which indicates the position of the transponder, is provided to an outer surface of a portion of the tire, the portion being where the transponder is disposed, and that a second identification tag, which indicates at least the position of the transponder in the circumferential direction of the tire, is provided to an outer surface of the other sidewall part of the tire, which is on the opposite side of the sidewall where the transponder is disposed.

In the present invention, an identification tag indicating a position of a transponder is provided to the outer surface of a portion of the tire, the portion being where the transponder is disposed. Thus, the position of the transponder can be recognized when viewed from the outside. Accordingly, the search time of the transponder can be reduced. Furthermore, a communication can be made by making the distance between a read device and the transponder the shortest. Hence, for a passive transponder functioning with energy transmitted from the outside, efficiency of energy transmission can be enhanced.

It suffices that the identification tag be one which indicates the position of the transponder. Any one of the following identification tags can be adopted: one having a color different from that of the outer surface of the tire and one having a solid shape decaled from a die. Furthermore, it suffices that the transponder have a color different from that of the outer surface of the tire, and that at least a part of the transponder be exposed to the outer surface of the tire, the part thus exposed forming an identification tag. In this case, even when a tire is tainted, or is worn out after being scraped against a curbstone and the like, the position of the transponder can be confirmed by viewing from the outside.

In the present invention, the transponder is provided to a tread part or a sidewall part of a tire, and an identification tag for the transponder is formed on the outer surface of the tire in the vicinity of the transponder. In a case where the transponder is provided to the sidewall part, the identification tag is provided to the outer surface of the sidewall part of the tire. In a case where the tire is mounted on the vehicle in a way that the transponder is located on a side of the tire, the side facing inward toward the vehicle, it is difficult to find the identification tag.

Accordingly, in a case where the transponder is provided to the sidewall part of the tire, it is preferable that a first identification tag be provided to the outer surface of a portion of the tire, the portion being where the transponder is disposed, and that a second identification tag be provided to the outer surface of the other sidewall part of the tire, which is on the opposite side of the sidewall part where the transponder is disposed. Thereby, even in a case where the tire is mounted on the vehicle in a manner that the transponder is located on a side of the tire, the side facing laterally inward toward the vehicle, the position of the transponder can be easily confirmed on the basis of the second identification tag. Thus, the vehicle can be stopped at a position where information held in the transponder is easily read. The second identification tag may be one which indicates at least the position of the transponder in the circumferential direction of the tire.

In a case of providing the first and second identification tags, it is preferable that the first and second identification tags have colors respectively different from the color of the tire, and that the colors respectively of the first and second identification tags be different from each other. Alternatively, it is preferable that the first and second identification tags have solid shapes decaled from dies, and that the solid shapes respectively of the first and second identification tags be different from each other. Thereby, the position of the transponder as seen from the front and from the back of the tire can be easily recognized.

Incidentally, it is preferable that a communication frequency of the transponder used in the present invention be not greater than 3 GHz, and that the effective communication range thereof be on the order of 50 cm. Thus, communication conditions suitable for identifying a tire can be secured.

BEST MODES FOR CARRYING OUT THE INVENTION

Figure 1:
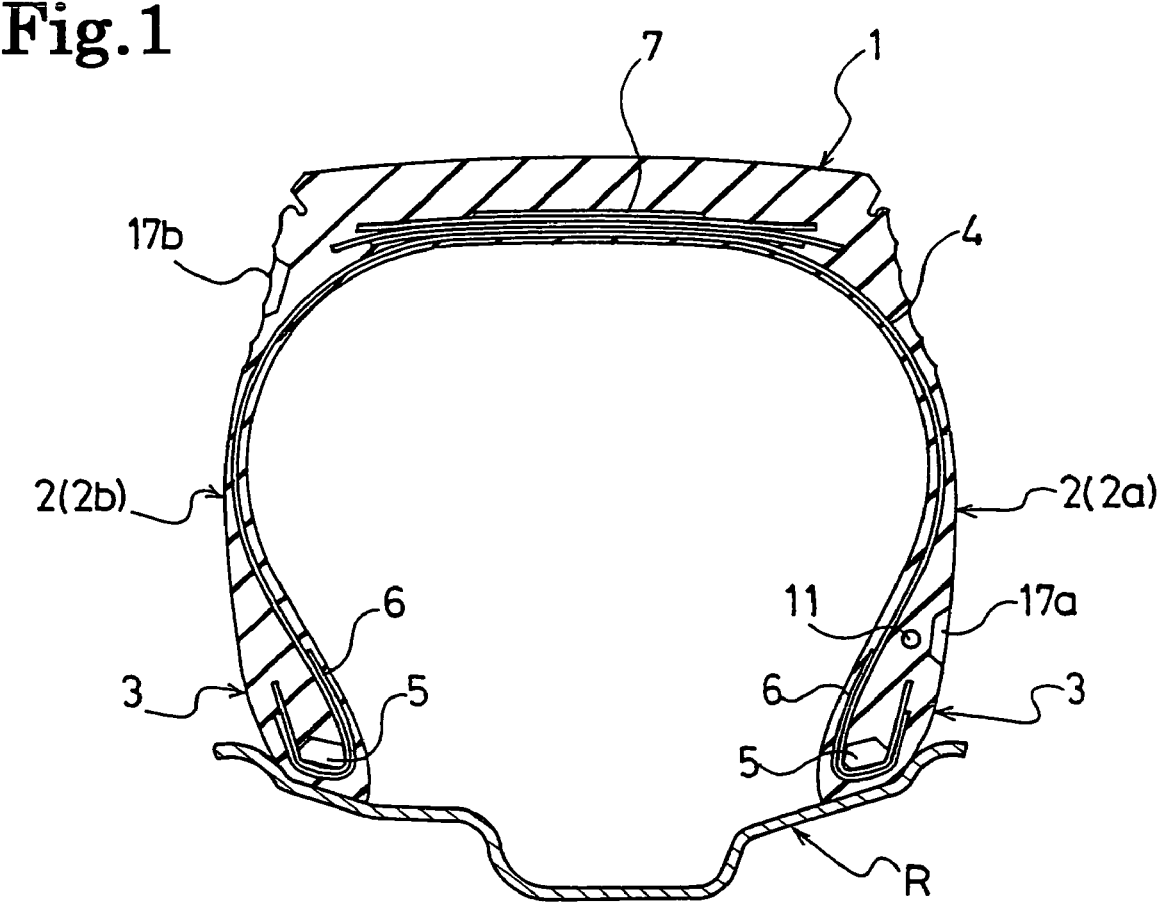
FIG. 1 is a meridian sectional view of a pneumatic tire of an embodiment of the present invention.
Figure 2:
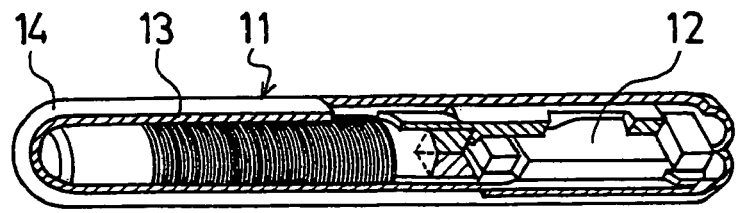
FIG. 2 is a partially cutaway perspective view of a transponder used for the pneumatic tire in FIG. 1.

Hereinafter, a constitution of the present invention is described in detail with reference to the accompanying drawings. FIG. 1 is a view showing a pneumatic tire of an embodiment of the present invention, and FIG. 2 is a partially cutaway view of a transponder. In FIG. 1, reference numeral 1 denotes a tread part; 2, a sidewall part; 3, a bead part; and reference symbol R denotes a rim of a wheel. Between a pair of beads 3 and 3, a carcass layer 4 is mounted, and the end of the carcass layer 4 is wound around a bead core 5 from a side toward the inside, to a side toward the outside, of the tire. In the bead 3, a steel cord reinforcement layer 6 is embedded in a way that the steel cord reinforcement layer 6 enfolds the carcass layer 4. A plurality of belt layers 7 are embedded on the outer side of the carcass layer 4.

On the above-describe pneumatic tire, a transponder 11 is embedded in one (2a) of a pair of sidewall parts 2. As shown in FIG. 2, the transponder 11 includes a circuit substrate 12 having a transmitting and receiving functions and a storing function, and an antenna coil 13. The circuit substrate 12 and the antenna coil 13 are covered with a tubular container 14 made of glass. The transponder 11 receives an electric wave from the outside, and sends data, such as identification numbers, which are previously stored, to the outside. It is needless to say that the transponder 11 may be one on which data are allowed to be written.

On the outer surface of a sidewall part 2a of the tire, the sidewall part 2a being where the transponder 11 is embedded, an identification tag 17a indicating a position of the transponder 11 is formed. The identification tag 17a has a shape of a dented solid formed on the outer surface of the tire, and is colored yellow different from the black color of the tire. On the other hand, an identification tag 17b which indicates at least the position of the transponder in the circumferential direction of the tire is formed on the outer surface of a sidewall part 2b of the tire, the sidewall part 2b being on the opposite side of the sidewall part 2a where the transponder is disposed. The position of the identification tag 17b in the radial direction of the tire is not needed to be specified, and may be disposed at a position close to the tread as shown in FIG. 1. The identification tag 17b has a shape of a dented solid formed on the outer surface of the tire, and is colored white different from the black color of the tire.

Figure 3:
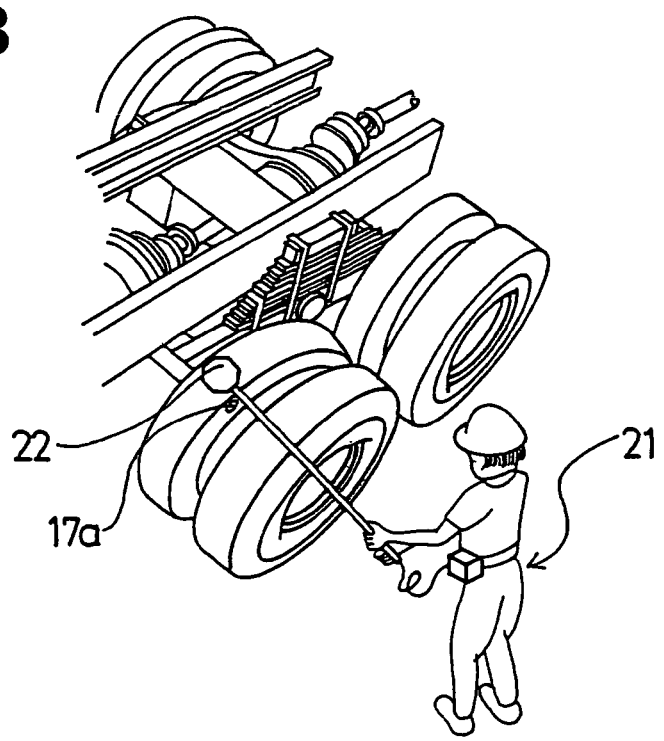
FIG. 3 is a perspective view showing a read operation of data from the transponder.

FIG. 3 is a view showing a read operation of data from a transponder. As shown in FIG. 3, an operator 21 performs a read operation on the transponder 11 using a read device 22. In this event, the position of the transponder 11 is identified on the basis of the identification tag 17a, and the vehicle is stopped at a position where the transponder 11 can be easily read to thereafter perform an operation of reading data. Even when a structure is that in which the transponder 11 is embedded in the tire, the search time for the transponder 11 can be reduced. Furthermore, since a communication can be made by making the distance between the read device 22 and the transponder 11 the shortest, there is no need to be concerned for a defect in reading or in writing. For a passive transponder functioning with energy transmitted from the outside, efficiency of energy transmission can be enhanced.

In a case where the tire is mounted on the vehicle in a manner that the transponder 11 is located on a side of the tire, the side facing laterally inward toward the vehicle, at least the position of the transponder 11 in the circumferential direction of the tire is identified on the basis of the identification tag 17b, and the transponder 11 can be easily found. Even in a case where the transponder 11 is disposed on any one of the front and back of the tire, a read operation can be swiftly performed.

Figure 4:
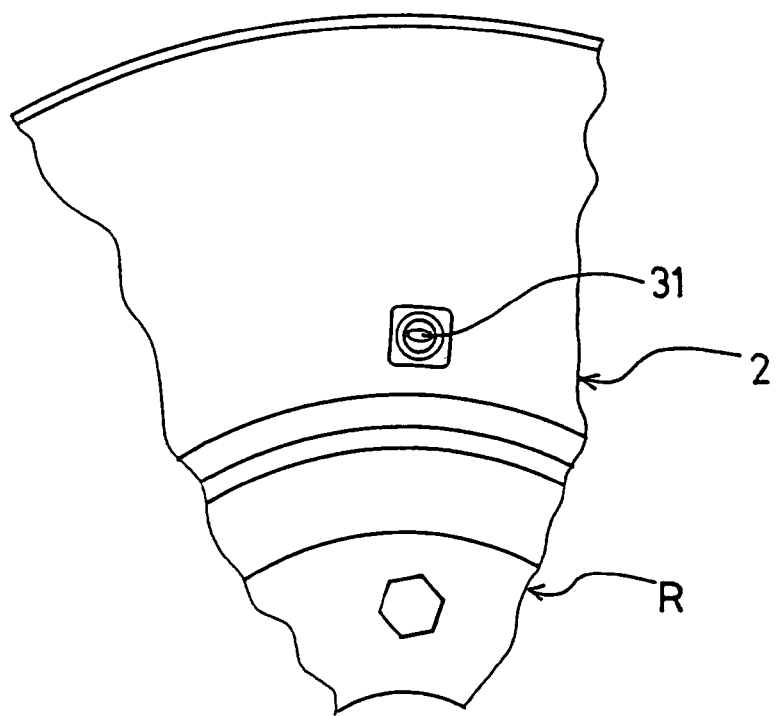
FIG. 4 is a side view showing a feature of a pneumatic tire of another embodiment of the present invention.
Figure 5:
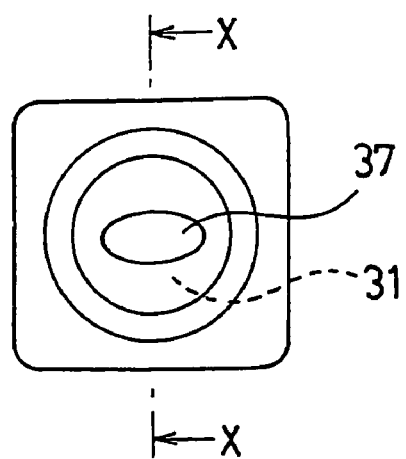
FIG. 5 is an enlarged side view of an identification tag for the pneumatic tire of the present invention.
Figure 6:
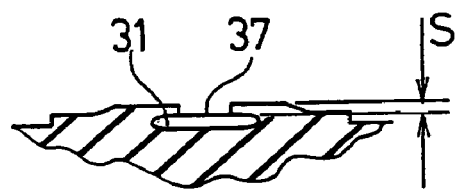
FIG. 6 is a cross-sectional view taken along the X-X line in FIG. 5.
Figure 7:
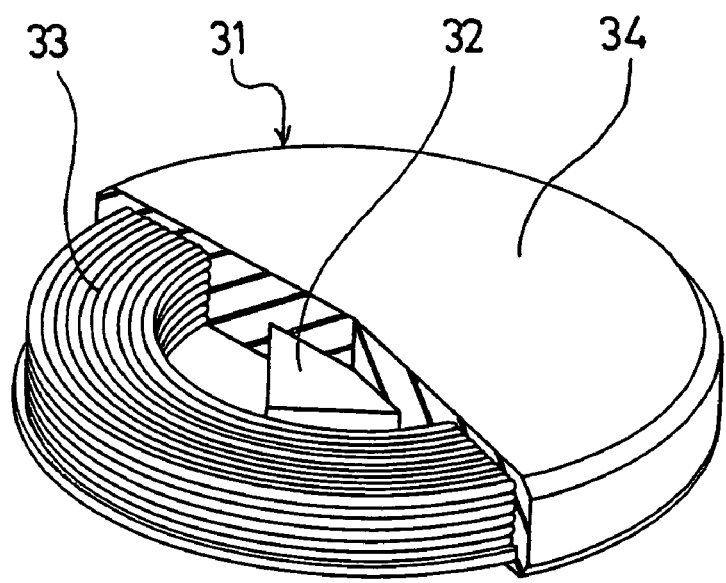
FIG. 7 is a partially cutaway perspective view of a transponder used for the pneumatic tire in FIG. 4.

FIG. 4 is a view of a pneumatic tire of another embodiment of the present embodiment; FIG. 5 is an enlarged view of an identification tag; FIG. 6 is a cross-sectional view taken along the X-X line in FIG. 5; and FIG. 7 is a partially cutaway view of a transponder. As shown in FIGS. 4 to 6, a transponder 31 is embedded in a sidewall 2, and a part of the sidewall 2 is exposed to the outer surface of the tire.

As shown in FIG. 7, the transponder 31 includes a circuit substrate 32 which has a transmitting and receiving functions and a storing function, and an antenna coil 33; and the circuit substrate 32 and the antenna coil 33 are covered with a covering member 34 made of resin. The transponder 31 receives an electric wave from the outside and sends data such as identification numbers, which are previously stored, to the outside. It is needless to say that the transponder 31 may be one on which data are allowed to be written.

The transponder 31 is colored yellow different from the black color of the tire. Accordingly, as shown in FIGS. 5 and 6, an exposed part of the transponder 31 forms an identification tag 37 which is demarcated from other parts. The shape of the transponder 31 is not limited to being circular plate-like as shown in FIGS. 4 to 7, and can be quadrangular plate-like or hexagonal plate-like, or can be further made sheet-like or string-like. It suffices that the covering resin be heat-resistant to a temperature at the time of vulcanizing of a tire. For example, the covering resin having a melting point or a pyrolysis temperature not lower than 200° can be selected.

The thickness S of a rubber part covering the transponder 31 is preferably in the range of 0.5 mm to 7 mm, and is more preferably in the range of 1 mm to 5 mm. When the thickness S is less than 0.5 mm, the effect of retaining the transponder 31 on the sidewall part 2 is insufficient. On the other hand, when the thickness S is greater than 7 mm, a defect tends to occur in a flow of rubber at the time of vulcanization. That is, by satisfying the above-described dimension, it is made possible to prevent the transponder 31 from falling off, and to maintain high durability, without a defect in the flow of rubber.

In the operation of reading the transponder 31 of the aforementioned pneumatic tire, the position of the transponder 31 can be identified, and the search time for the transponder 31 can be reduced. Moreover, since a communication can be made by making the distance between a read device and the transponder 31 the shortest, there is no need to be concerned for a defect in reading or in writing. For a passive transponder functioning with energy transmitted from the outside, efficiency of energy transmission can be enhanced.

In the above-described embodiments, the descriptions have been provided for cases where the transponder, which is stick-like, plate-like, or sting-like, are used. However, the shape of the transponder is not particularly limited to the above in the present invention. The transponder may be embedded more towards the inside of the tire than the tire carcass, or a sheet-like transponder may be adhered to the inner surface of the tire. Meanwhile, the identification tag indicating the position of the transponder is demarcated from other parts on the basis of color or shape of the tag. Cases where the color of the identification tag is different from that of the outer surface of the tire includes cases where any of tint, brightness, and hue of the above two colors is different from each other. Especially, a light color in yellow, white, or the like is preferable. As a solid shape given to the identification tag, the following shapes can be adopted: a concave shape as a dimple on the outer surface of the tire; a convex shape protruded from the outer surface of the tire; a shape formed by combining a concave shape and a convex shape, and the like.

As described above, the preferred embodiments of the present invention have been described in detail. It is to be understood that various changes, modifications, and substitutions can be made without departing from the spirit and scope of the present invention as specified in the scope of the appended claims.

EXAMPLE

Twenty pneumatic tires (tires of Example), to which identification tags for transponders were respectively disposed, and twenty pneumatic tires (conventional tires), to which no identification tags for transponders were disposed, were manufactured. The size of the tire was 11R22.516PR. For each of the tires of Example, a transponder was embedded in a sidewall part of the tire in a position 40 mm from the rim flange toward the outside in the radial direction of the tire.

As a transponder, one (refer to FIG. 7) in which a circuit substrate and an antenna coil are covered with a bisphenol A epoxy resin having Shore D hardness 96, the resin being colored yellow at a kick-off temperature 300° C. was used. The above transponder had an outer diameter of 20 mm, and had a thickness of 3 mm. The communication range of the transponder was 10 cm, and a standard period of time for reading the transponder was 0.3 seconds.

In Example, an elliptical opening of a size of 15 mm×10 mm was formed on a rubber part of the outer surface of the tire in a manner that the middle portion of the transponder was exposed. This portion was used as a first identification tag. In Example, a second identification tag, which was colored white, was provided to the other sidewall part of the tire, which is on the opposite side of the sidewall where the transponder was embedded.

Tires of Example and the conventional tires were mounted respectively on two motor trucks (maximum authorized freight mass of 8 tons). Using a read device, an operator read data from transponders of respective tires. The mean values respectively of read operation time for tires of Example and of that for the conventional tires were obtained. The results thereof are shown in Table 1. The read operation time is indicated using indices in which the result obtained from the conventional tires is set to be 100.

TABLE 1

|  | Conventional Tires | Example |
| --- | --- | --- |
| Identification Tag | Not used | Used (on both sidewall parts) |
| Read Operation Time | 100 | 20 |

As is clear from Table 1, since the tires of Example were provided with transponders, it was made possible to perform the read operation quickly without a need for searching the transponder along the circumferential direction of the tire, unlike the case of the conventional tires.

What is claimed is:

1. A pneumatic tire comprising a transponder, storing identification information of the tire and fully embedded in a tire rubber on a sidewall part thereof, wherein;
    a first identification tag, which visually indicates a position of the transponder, is indented in an outer surface of a rubber of a portion of the tire, the portion being where the transponder is disposed;
    a second identification tag, which visually indicates at least the position of the transponder in a circumferential direction of the tire, is provided to an outer surface of the other sidewall part of the tire, which is on the opposite side of the sidewall part where the transponder is disposed;
    the first and second identification tags respectively have colors different from a color of the outer surface of the tire; and
    the first and second identification tags respectively have colors different from each other.

2. The pneumatic tire according to claim 1, wherein the second identification tag is indented in the outer surface of the rubber of the other sidewall part of the tire.

3. A pneumatic tire comprising a transponder, storing identification information of the tire and fully embedded in a tire rubber on a sidewall part thereof, wherein:
    a first identification tag, which visually indicates a position of the transponder, is indented in an outer surface of a rubber of a portion of the tire, the portion being where the transponder is disposed;
    a second identification tag, which visually indicates at least the position of the transponder in a circumferential direction of the tire, is provided to an outer surface of the other sidewall part of the tire, which is on the opposite side of the sidewall part where the transponder is disposed;
    the first and second identification tags respectively have solid shapes; and
    solid shapes respectively of the first and second identification tags are different from each other.

4. The pneumatic tire according to claim 3, wherein the second identification tag is indented in the outer surface of the rubber of the other sidewall part of the tire.

* * * * *